(12) United States Patent
Lubold et al.

(10) Patent No.: US 12,741,752 B2
(45) Date of Patent: Sep. 22, 2026

(54) SYSTEMS AND METHODS FOR VISUALIZATION OF AUTOMATED ACTIONS USING A HOLOGRAPHIC AGENT

(71) Applicant: HONEYWELL INTERNATIONAL INC., Charlotte, NC (US)

(72) Inventors: Nichola Lubold, Phoenix, AZ (US); Tor Finseth, Plymouth, MN (US); Robert De Mers, Plymouth, MN (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 120 days.

(21) Appl. No.: 18/924,540

(22) Filed: Oct. 23, 2024

(65) Prior Publication Data

US 2026/0109472 A1 Apr. 23, 2026

(51) Int. Cl.
*B64D 45/00* (2006.01)
*G06T 11/00* (2026.01)
*G06V 20/59* (2022.01)

(52) U.S. Cl.
CPC .............. *B64D 45/00* (2013.01); *G06T 11/00* (2013.01); *G06V 20/597* (2022.01); *G06T 2200/24* (2013.01)

(58) Field of Classification Search
CPC ...... B64D 45/00; G06V 20/597; G06T 11/00; G06T 2200/24
See application file for complete search history.

(56) References Cited

U.S. PATENT DOCUMENTS 10,095,228 B1 10/2018 Kuffner, Jr. et al.
10,532,814 B2 1/2020 Chapman et al.
10,816,970 B2 10/2020 Bosworth et al.
11,492,017 B2 11/2022 Tamagaki et al.
11,640,812 B2 5/2023 Bronder et al.
(Continued)

FOREIGN PATENT DOCUMENTS

CN 117648030 A 3/2024

OTHER PUBLICATIONS

XP093364900, Teslahere: "Autopilot Incar Augmented View Tesla", , Dec. 15, 2020 (Dec. 15, 2020), XP093364900, Retrieved from the Internet: URL:https://www.youtube.com/watch?v=7in7_I s23gY * Shots 02:59 and 03:15 *.

(Continued)

*Primary Examiner* — Yaron Cohen
(74) *Attorney, Agent, or Firm* — Ingrassia Fisher & Lorenz

(57) ABSTRACT

Systems and methods are provided for systems and methods for visualization of automated actions using a holographic agent. A selection of a holographic form of a holographic agent is received. An automated control notification associated with an automated control action is received at a first time. The automated control action is scheduled for implementation at a second time by an autopilot system of a vehicle. The second time is after the first time. An agent action is generated based at least in part on the automated control action. A command is transmitted to a hologram generation system to generate the holographic agent in the selected holographic form to engage in the agent action at the first time. The agent action is a visual representation of the implementation of the automated control action by the autopilot system prior to the implementation of the first automated control action at the second time.

20 Claims, 5 Drawing Sheets

(56) References Cited

U.S. PATENT DOCUMENTS

2019/0389565 A1 12/2019 LissaJoux et al.
2020/0211287 A1* 7/2020 Evans .................. H04N 13/332

OTHER PUBLICATIONS

XP093366539, Kim Java: "I Lost Self Driving in my Tesla for Doing This", , Jun. 17, 2023 (Jun. 17, 2023), Retrieved from the Internet: URL:https://www.youtube.com/watch?v=adBzEj L_c00 * Shots 15:00-16:00 *.

XP093366700, Tech World: "Tesla FSD Conquers Curves & Stop Signs at Night!", Dec. 25, 2023 (Dec. 25, 2023), Retrieved from the Internet: URL:https://www.youtube.com/watch?v=vd60gxRbxdU * Shots 01:08 *.

* cited by examiner

SYSTEMS AND METHODS FOR VISUALIZATION OF AUTOMATED ACTIONS USING A HOLOGRAPHIC AGENT

TECHNICAL FIELD

The present invention generally relates to aircraft operations and more particularly relates to systems and methods for visualization of automated actions using holographic agent.

BACKGROUND

Face to face interactions between crew members typically communicate intent and execution of vehicle operation actions using a rich stream of gestures, expressions, and vocalizations. Automated systems often communicate an intention to implement an automated action through discrete mode annunciations and flat displays. The implementation of automated actions by flight deck and avionic control systems may be a difficult to trust, monitor, and interact with under challenging vehicle operation conditions. Annunciations associated with automated action may suffer from information deficits associated with vehicle system states and underlying context posing a challenge for crew member intervention in halting or counteracting an automated action.

Hence, there is a need for systems and methods for visualization of automated actions using a holographic agent.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a system for visualization of automated actions using a holographic agent includes at least one processor and at least one memory communicatively coupled to the at least one processor. The at least one memory includes instructions that upon execution by the at least one processor, cause the at least one processor to: receive a selection of a holographic form of a holographic agent via a user interface; receive a first automated control notification associated with a first automated control action at a first time, the first automated control action being scheduled for implementation at a second time by an autopilot system of a vehicle, the second time being after the first time; generate a first agent action based at least in part on the first automated control action; and transmit a first command to a hologram generation system to generate the holographic agent in the selected holographic form to engage in the first agent action at the first time, the first agent action being a visual representation of the implementation of the first automated control action by the autopilot system prior to the implementation of the first automated control action at the second time.

In various embodiments, a method for visualization of automated actions using a holographic agent includes: receiving a selection of a holographic form of a holographic agent via a user interface; receiving a first automated control notification associated with a first automated control action at a first time, the first automated control action being scheduled for implementation at a second time by an autopilot system of a vehicle, the second time being after the first time; generating a first agent action based at least in part on the first automated control action; and transmitting a first command to a hologram generation system to generate the holographic agent in the selected holographic form to engage in the first agent action at the first time, the first agent action being a visual representation of the implementation of the first automated control action by the autopilot system prior to implementation of the first automated control action at the second time.

In various embodiments, an aircraft including a system for visualization of automated actions using a holographic agent includes at least one processor and at least one memory communicatively coupled to the at least one processor. The at least one memory includes instructions that upon execution by the at least one processor, cause the at least one processor to: receive a selection of a holographic form of a holographic agent via a user interface; receive a first automated control notification associated with a first automated control action at a first time, the first automated control action being scheduled for implementation at a second time by an autopilot system of a vehicle, the second time being after the first time; generate a first agent action based at least in part on the first automated control action; and transmit a first command to a hologram generation system to generate the holographic agent in the selected holographic form to engage in the first agent action at the first time, the first agent action being a visual representation of the implementation of the first automated control action by the autopilot system prior to implementation of the first automated control action at the second time.

Furthermore, other desirable features and characteristics of the systems and methods for visualization of automated actions using a holographic agent become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
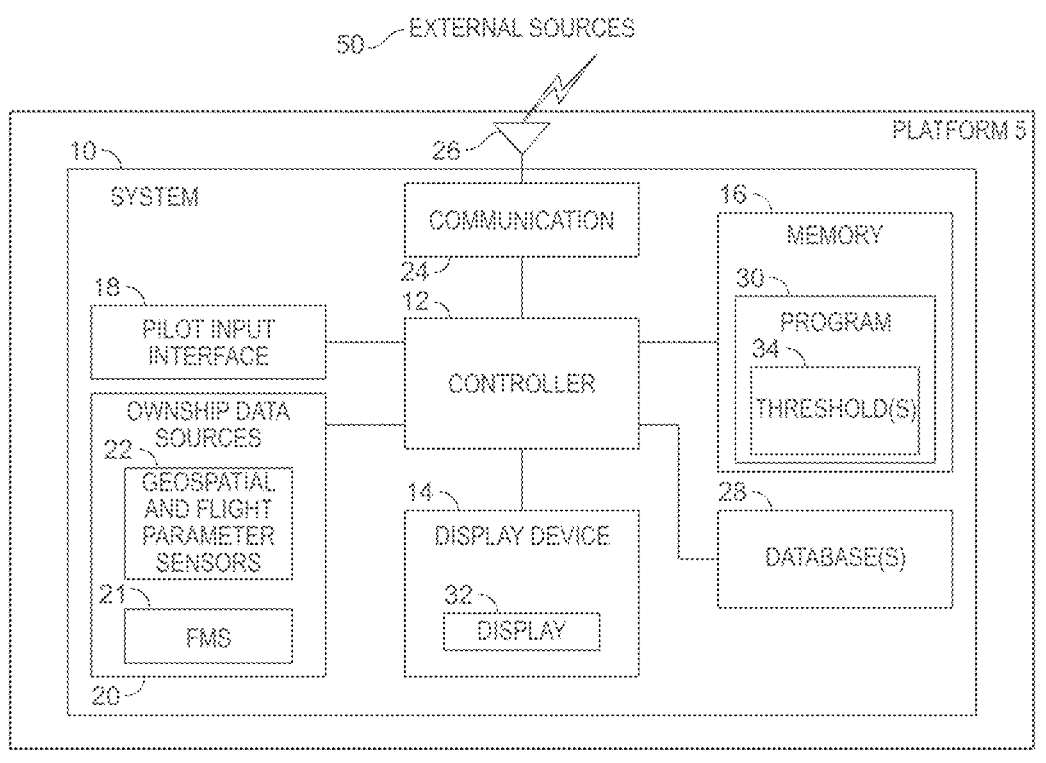
FIG. 1 is a block diagram representation of a system configured implement visualization of automated actions using a holographic agent in accordance with least one embodiment.

Referring to FIG. 1, a block diagram representation of a system 10 configured implement visualization of automated actions using a holographic agent in accordance with least one embodiment (shortened herein to "system" 10) is shown. The system 10 may be utilized onboard a mobile platform 5, as described herein. In various embodiments, the mobile platform is an aircraft, which carries or is equipped with the system 10. As schematically depicted in FIG. 1, the system 10 includes the following components or subsystems, each of which may assume the form of a single device or multiple interconnected devices: a controller circuit 12 operationally coupled to: at least one display device 14; computer-readable storage media or memory 16; an optional input interface 18, and ownship data sources 20 including, for example, a flight management system (FMS) 21 and an array of flight system state and geospatial sensors 22.

In various embodiments, the system 10 may be separate from or integrated within: the flight management system (FMS) 21 and/or a flight control system (FCS). Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the mobile platform 5.

The term "controller circuit" (and its simplification, "controller"), broadly encompasses those components utilized to carry-out or otherwise support the processing functionalities of the system 10. Accordingly, the controller circuit 12 can encompass or may be associated with a programmable logic array, application specific integrated circuit or other similar firmware, as well as any number of individual processors, flight control computers, navigational equipment pieces, computer-readable memories (including or in addition to the memory 16), power supplies, storage devices, interface cards, and other standardized components. In various embodiments, the controller circuit 12 embodies one or more processors operationally coupled to data storage having stored therein at least one firmware or software program (generally, computer-readable instructions that embody an algorithm) for carrying-out the various process tasks, calculations, and control/display functions described herein. During operation, the controller circuit 12 may be programmed with and execute the at least one firmware or software program, for example, a program 30, that embodies an algorithm described herein for implementing visualization of automated actions using a holographic agent in accordance with least one embodiment on a mobile platform 5, where the mobile platform 5 is an aircraft, and to accordingly perform the various process steps, tasks, calculations, and control/display functions described herein.

The controller circuit 12 may exchange data, including real-time wireless data, with one or more external sources 50 to support operation of the system 10 in embodiments. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

The memory 16 is a data storage that can encompass any number and type of storage media suitable for storing computer-readable code or instructions, such as the aforementioned software program 30, as well as other data generally supporting the operation of the system 10. The memory 16 may also store one or more threshold 34 values, for use by an algorithm embodied in software program 30. One or more database(s) 28 are another form of storage media; they may be integrated with memory 16 or separate from it.

In various embodiments, aircraft-specific parameters and information for an aircraft may be stored in the memory 16 or in a database 28 and referenced by the program 30. Non-limiting examples of aircraft-specific information includes an aircraft weight and dimensions, performance capabilities, configuration options, and the like.

Flight parameter sensors and geospatial sensors 22 supply various types of data or measurements to the controller circuit 12 during an aircraft flight. In various embodiments, the geospatial sensors 22 supply, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data.

With continued reference to FIG. 1, the display device 14 can include any number and type of image generating devices on which one or more avionic displays 32 may be produced. When the system 10 is utilized for a manned aircraft, the display device 14 may be affixed to the static structure of the Aircraft cockpit as, for example, a Head Down Display (HDD) or Head Up Display (HUD) unit. In various embodiments, the display device 14 may assume the form of a movable display device (e.g., a pilot-worn display device) or a portable display device, such as an Electronic Flight Bag (EFB), a laptop, or a tablet computer carried into the aircraft cockpit by a pilot.

At least one avionic display 32 is generated on the display device 14 during operation of the system 10; the term "avionic display" is synonymous with the term "aircraft-related display" and "cockpit display" and encompasses displays generated in textual, graphical, cartographical, and other formats. The system 10 can generate various types of lateral and vertical avionic displays 32 on which map views and symbology, text annunciations, and other graphics pertaining to flight planning are presented for a pilot to view. The display device 14 is configured to continuously render at least a lateral display showing the aircraft at its current location within the map data. The avionic display 32 generated and controlled by the system 10 can include graphical user interface (GUI) objects and alphanumerical input displays of the type commonly presented on the screens of multifunction control display units (MCDUs), as well as Control Display Units (CDUs) generally. Specifically, embodiments of the avionic displays 32 include one or more two-dimensional (2D) avionic displays, such as a horizontal (i.e., lateral) navigation display or vertical navigation display (i.e., vertical situation display VSD); and/or on one or more three dimensional (3D) avionic displays, such as a Primary Flight Display (PFD) or an exocentric 3D avionic display.

In various embodiments, a human-machine interface is implemented as an integration of a pilot input interface 18 and a display device 14. In various embodiments, the display device 14 is a touch screen display. In various embodiments, the human-machine interface also includes a separate pilot input interface 18 (such as a keyboard, cursor control device, voice input device, or the like), generally operationally coupled to the display device 14. Via various display and graphics systems processes, the controller circuit 12 may command and control a touch screen display device 14 to generate a variety of graphical user interface (GUI) objects or elements described herein, including, for example, buttons, sliders, and the like, which are used to prompt a user to interact with the human-machine interface to provide user input; and for the controller circuit 12 to activate respective functions and provide user feedback, responsive to received user input at the GUI element. In at least one embodiment, a human-machine interface is implemented via a holographic agent generated by a hologram generation system.

In various embodiments, the system 10 may also include a dedicated communications circuit 24 configured to provide a real-time bidirectional wired and/or wireless data exchange for the controller 12 to communicate with the external sources 50 (including, each of: traffic, air traffic control (ATC), satellite weather sources, ground stations, and the like). In various embodiments, the communications circuit 24 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 24 is integrated within the controller circuit 12, and in other embodiments, the communications circuit 24 is external to the controller circuit 12. When the external source 50 is "traffic," the communications circuit 24 may incorporate software and/or hardware for communication protocols as needed for traffic collision avoidance (TCAS), automatic dependent surveillance-broadcast (ADS-B), and enhanced vision systems (EVS).

In certain embodiments of the system 10, the controller circuit 12 and the other components of the system 10 may be integrated within or cooperate with any number and type of systems commonly deployed onboard an aircraft including, for example, an FMS 21.

The disclosed algorithm is embodied in a hardware program or software program (e.g. program 30 in controller circuit 12) and configured to operate when the aircraft is in any phase of flight.

In various embodiments, the provided controller circuit 12, and therefore its program 30 may incorporate the programming instructions for: receiving a selection of a holographic form of a holographic agent via a user interface; receiving a first automated control notification associated with a first automated control action scheduled for implementation at a first time by an autopilot system of a vehicle; generating a first agent action based at least in part on the first automated control action; and transmitting a first command to a hologram generation system to generate the holographic agent in the selected holographic form to engage in the first agent action at the first time, the first agent action being a visual representation of the implementation of the first automated control action by the autopilot system.

Figure 2:
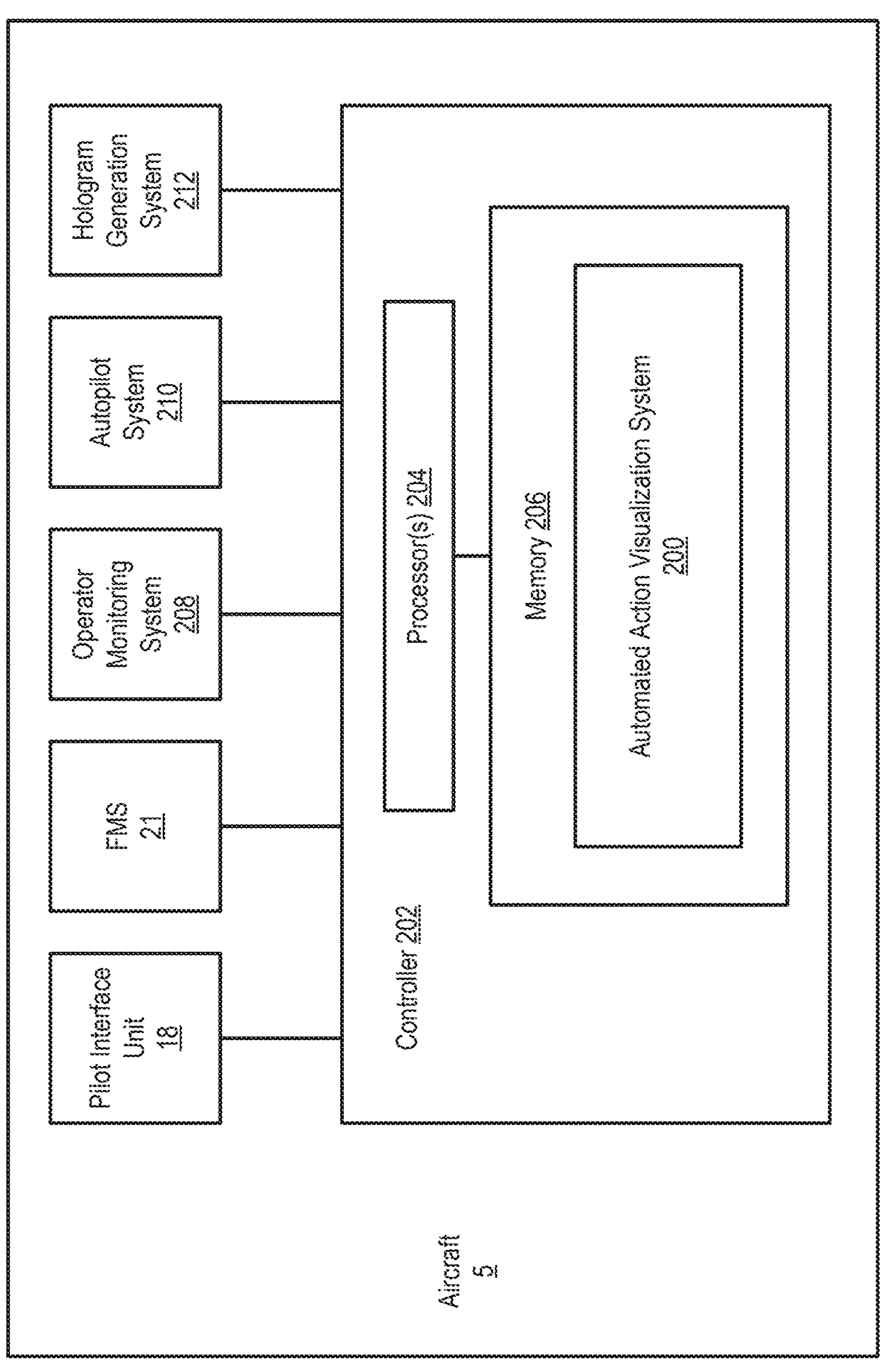
FIG. 2 is a block diagram representation of an aircraft including an automated action visualization system in accordance with at least one embodiment.

Referring to FIG. 2, a block diagram representation of an aircraft 5 including an automated action visualization system 200 in accordance with at least one embodiment is shown. The aircraft 5 includes a controller 202. The controller 202 includes at least one processor 204 and at least one memory 206. The at least one memory 206 includes the automated action visualization system 200. In various embodiments, the controller 202 may include additional components that facilitate operation of the controller 202.

The controller 202 is configured to be communicatively coupled to a pilot interface unit 18, a flight management system (FMS) 21, an operator monitoring system 208, an autopilot system 210, and a hologram generation system 212. The pilot interface unit 18 is similar to the pilot interface unit 18 described with reference to FIG. 1. The FMS 21 is similar to the FMS 21 described with reference to FIG. 1. In at least one embodiment, the operator monitoring system 208 includes one or more cameras. In at least one embodiment, the autopilot system 210 is configured to implement partial automation of aircraft operations. In at least one embodiment, the autopilot system 210 is configured to implement complete automation of aircraft operations.

In at least one embodiment, the hologram generation system 212 is an augmented reality (AR) system. In at least one embodiment, the hologram generation system 212 is a mixed reality (MR) system. In at least one embodiment, the hologram generation system 212 is a reflection hologram system. In at least one embodiment, the hologram generation system 212 is a transmission hologram system. In at least one embodiment, the hologram generation system 212 is a hybrid hologram system. The operation of the automated action visualization system 200 will be described in greater detail below.

Figure 3:
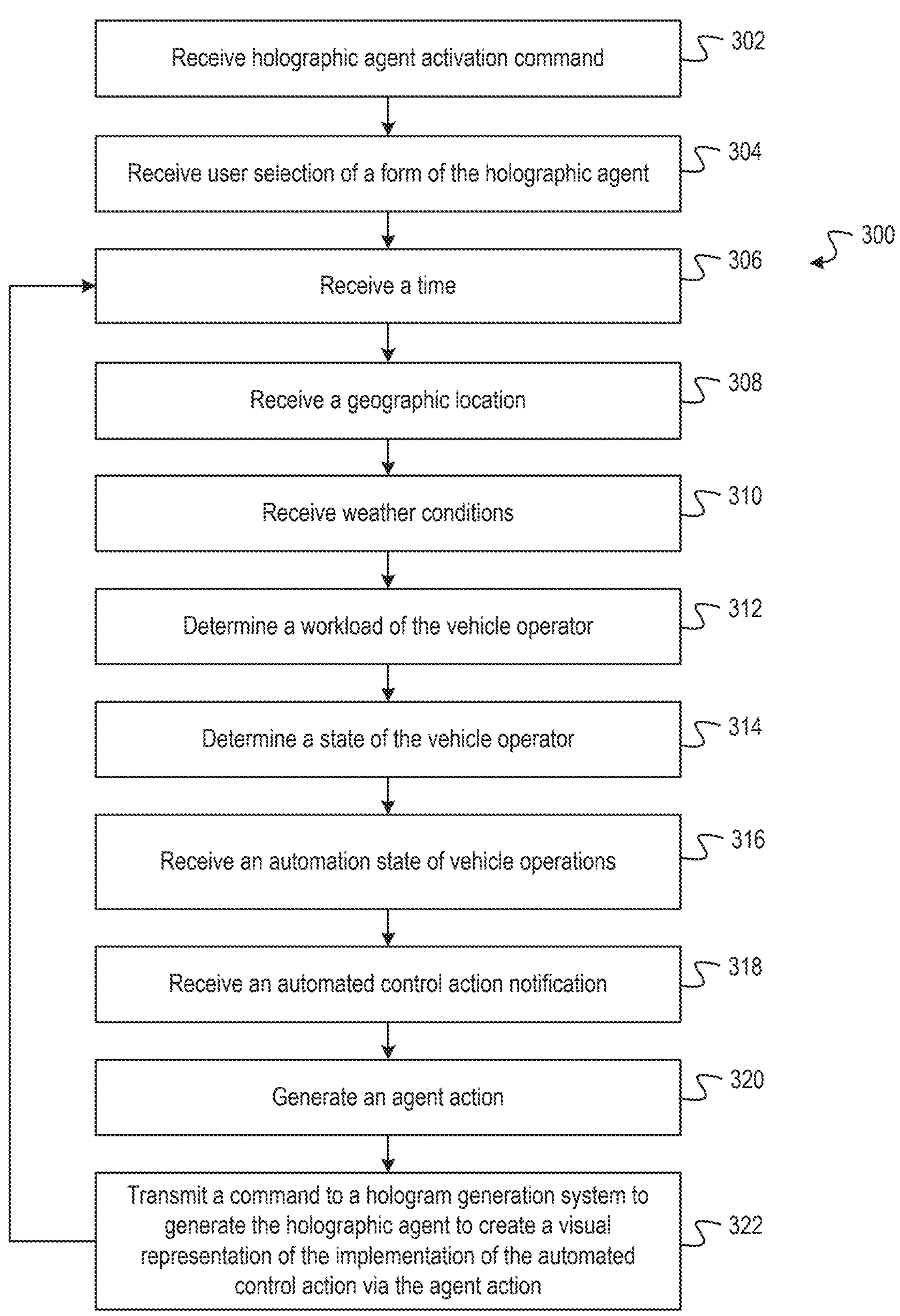
FIG. 3 is a flowchart representation of a method of implementing visualization of automated actions using a holographic agent in accordance with at least one embodiment.

Referring to FIG. 3, a flowchart representation of a flowchart representation of a method 300 of implementing visualization of automated actions using a holographic agent is shown. The method 300 will be described with reference to an exemplary implementation of a automated action visualization system 200. As can be appreciated in light of the disclosure, the order of operation within the method 300 is not limited to the sequential execution as illustrated in FIG. 3 but may be performed in one or more varying orders as applicable and in accordance with the present disclosure.

At 302, the automated action visualization system 200 receives a holographic agent activation command. In at least one embodiment, the automated action visualization system 200 receives the holographic agent activation command from a pilot via a pilot interface unit 18 of an Aircraft 5.

At 304, the automated action visualization system 200 receives a selection of a holographic form of the holographic agent via a user interface. In at least one embodiment, the automated action visualization system 200 receives the selection of the form of the holographic agent via the pilot interface unit 18 of the aircraft 5. Examples of holographic forms include, but are not limited to, an anthropomorphic form, a human head form, a human hand form, a textual form, a numerical form, a symbolic form, and an instructional image form.

At 306, the automated action visualization system 200 receives a time. In at least one embodiment, the automated action visualization system 200 receives the time from a clock of the aircraft 5. In at least one embodiment, the automated action visualization system 200 receives the time from the FMS 21.

At 308, the automated action visualization system 200 receives a geographic location of the aircraft 5. In at least one embodiment, the automated action visualization system 200 receives the geographic location from the FMS 21. In at least one embodiment, the automated action visualization system 200 receives the geographic location from an Automatic Dependent Surveillance-Broadcast (ADS-B) system. In at least one embodiment, the automated action visualization system 200 receives the geographic location from a geospatial sensor(s) 22.

At 310, the automated action visualization system 200 receives the weather conditions. In at least one embodiment, the automated action visualization system 200 receives the weather conditions from the FMS 21. In at least one embodiment, the FMS 21 receives the weather conditions from a satellite weather source.

At 312, the automated action visualization system 200 determines a workload of the vehicle operator. In at least one embodiment, the vehicle operator is a pilot of the aircraft 5. In at least one embodiment, the automated action visualization system 200 receives images of the vehicle operator from an operator monitoring system 208. In at least one embodiment, the operator monitoring system 208 includes one or more cameras onboard the aircraft 5. The one or more cameras transmit the images of the vehicle operator, such as for example the pilot, to the automated action visualization system 200. The automated action visualization system 200 determines the workload of the vehicle operator based on received images of the vehicle operator. In at least one embodiment, the automated action visualization system 200 receives a phase of flight of the aircraft 5 from the FMS 21. The automated action visualization system 200 determines the workload of the vehicle operator based on the phase of flight of the aircraft 5.

At 314, the automated action visualization system 200 determines a state of the vehicle operator. In at least one embodiment, the vehicle operator is a pilot of the aircraft 5. In at least one embodiment, the automated action visualization system 200 receives images of the vehicle operator from an operator monitoring system 208. In at least one embodiment, the operator monitoring system 208 includes one or more cameras onboard the aircraft 5. The one or more cameras transmit the images of the vehicle operator, such as for example the pilot, to the automated action visualization system 200. The automated action visualization system 200 determines the state of the vehicle operator based on received images of the vehicle operator. Examples of the state of the vehicle operator include an alertness level of the vehicle operator and a gaze direction of the vehicle operator.

At 316, the automated action visualization system 200 receives an automation state of vehicle operations from an autopilot system of the vehicle. In at least one embodiment, the vehicle is an aircraft 5. Examples of automation states include, but are not limited to, partial automation and complete automation of vehicle operations.

At 318, the automated action visualization system 200 receives an automated control notification associated with an automated control action from the autopilot system 210 of the vehicle at a first time. In at least one embodiment, the vehicle is an aircraft 5. The automated control action is scheduled for implementation at a second time by the autopilot system 210 of the vehicle. The second time is after the first time. In at least one embodiment, the automated control action is an automated aircraft operation control action that is scheduled for implementation at the second time by an autopilot system of an aircraft 5.

At 320, the automated action visualization system 200 generates an agent action based on the automated control action received from the autopilot system 210. The automated action visualization system 200 generates the agent action for implementation via a holographic agent based on the automated control action at the first time.

At 322, the automated action visualization system 200 transmits a command to a hologram generation system 212 to generate a holographic agent in the selected holographic form to engage in the agent action at the first time. The holographic agent provides a visual representation of the implementation of the automated control action by the autopilot system 210 via the agent action prior to the implementation of the automated control action by the autopilot system 210 at the second time. The presentation of the visual representation of the automated control action using the holographic agent prior to the actual implementation of the automated control action provides the pilot with advance notice that that automated control action is scheduled for implementation.

In at least one embodiment, the automated action visualization system 200 transmits a command to a hologram generation system 212 to generate the holographic form of the holographic agent based in part one on more of the time received at 306, the geographic location of the aircraft 5 received at 308, the weather conditions received at 310, and an automation state received at 316.

In at least one embodiment, the automated action visualization system 200 transmits a command to a hologram generation system 212 to generate the holographic agent at a location within the vehicle based on one or more of the workload of the vehicle operator determined at 312 and the state of the vehicle operator determined at 314. For example, if the automated action visualization system 200 determined a gaze direction of the vehicle operator to be on a clipboard, the automated action visualization system 200 transmits the command to the hologram generation system 212 to generate the holographic agent on the clipboard. The hologram generation system 212 generates the holographic agent to provide the visual representation of the implementation of the automated control action via the agent action at the first time. If, for example, the automated action visualization system 200 determined a high workload of the vehicle operator, the automated action visualization system 200 transmits the command to the hologram generation system 212 to generate the holographic agent in a vehicle location that will not interfere with an ability of the vehicle operator to focus on tasks associated with the high workload. The method 300 returns to 306.

While the automated action visualization system 200 in the method 300 has been described with reference to a vehicle operator of an aircraft 5, the automated action visualization system 200 may be used to implement the method 300 for a vehicle operator of a ground vehicle, a vehicle operator an underwater vehicle, and a vehicle operator of a water surface vehicle.

The automated action visualization system 200 is configured to receive a first automated control notification associated with a first automated control action at a first time. The automated action visualization system 200 is configured to receive the first automated control notification from the autopilot system 210. The first automated control action is scheduled for implementation at a second time by the autopilot system 210. The second time is after the first time. The automated action visualization system 200 is configured to generate a first agent action based on the first automated control action and transmit a first command to a hologram generation system 212 to generate the holographic agent to engage in the first agent action at the first time. The first agent action is a visual representation of the implementation of the first automated control action by the autopilot system prior to the implementation of the first automated control action at the second time.

In at least one embodiment, the pilot implements a manual control action via a control interface following the execution of the first automated control action. A second automated control action is generated by the autopilot system 210 in response to the manual control action. The automated action visualization system 200 is configured to receive a second automated control notification associated with the second automated control action from the autopilot system 210 at a third time. The second automated control action is scheduled for implementation at a fourth time by the autopilot system 210. The fourth time is after the third time. The automated action visualization system 200 is configured to generate a second agent action based on the second automated control action and transmit a second command to the hologram generation system 212 to generate the holographic agent to engage in the second agent action at the third time. The second agent action is a visual representation of the implementation of the second automated control action by the autopilot system 210 prior to the implementation of the second automated control action at the fourth time.

In at least one embodiment, the pilot implements a manual control action via a control interface prior to the execution of the first automated control action to override the execution of the first automated control action. A second automated control action is generated by the autopilot system 210 in response to the manual control action. The automated action visualization system 200 is configured to receive a second automated control notification associated with the second automated control action from the autopilot system 210 at a third time. The second automated control action is scheduled for implementation at a fourth time by the autopilot system 210. The fourth time is after the third time. The automated action visualization system 200 is configured to generate a second agent action based on the second automated control action and transmit a second command to the hologram generation system 212 to generate the holographic agent to engage in the second agent action at the third time. The second agent action is a visual representation of the implementation of the second automated control action by the autopilot system 210 prior to the implementation of the second automated control action at the fourth time. The generation of a holographic agent engaged in an agent action that represents an automated control action prior to the implementation of that automated control action provides a vehicle operator with the opportunity to override the automated control action if warranted.

In at least one embodiment, the automated action visualization system 200 is configured to receive a second automated control notification associated with a second automated control action at the first time. The automated action visualization system 200 is configured to receive the second automated control notification from the autopilot system 210. The second automated control action is scheduled for implementation at the second time by the autopilot system 210. The automated action visualization system 200 is configured to generate a second agent action based on the second automated control action and transmit a second command to a hologram generation system 212 to generate another holographic agent to engage in the second agent action at the first time. The second agent action is a visual representation of the implementation of the second automated control action by the autopilot system prior to the implementation of the second automated control action at the second time. The automated action visualization system 200 is configured to transmit commands to the hologram generation system 212 to generate multiple holographic agents that engage in agent actions that reflect multiple automated actions that are scheduled for implementation by the autopilot system 210 at the same time.

In at least one embodiment, the automated action visualization system 200 is configured to receive images of a vehicle operator from an operator monitoring system 208. The automated action visualization system 200 is configured to determine a state of the vehicle operator based on the images of the vehicle operator and activate operation of the automated action visualization system 200 based on the state of the vehicle operator.

Figure 4:
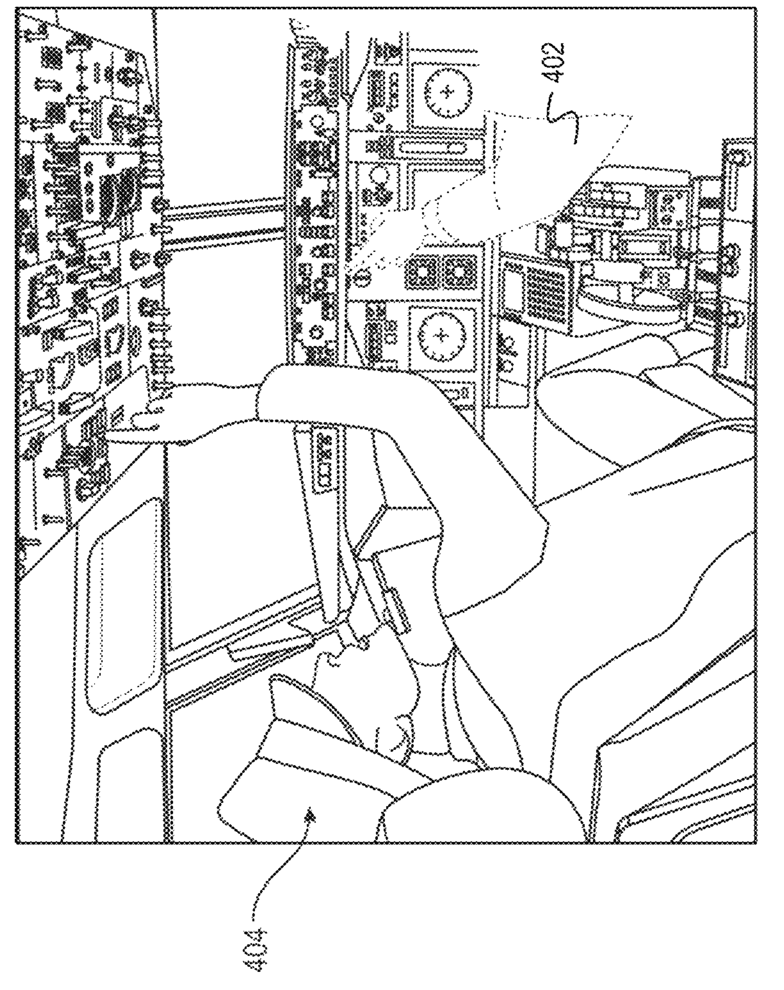
FIG. 4 is an exemplary illustration of a holographic agent in the form of a holographic hand in a cockpit of an aircraft in accordance with at least one embodiment.

Referring to FIG. 4, an exemplary illustration of a holographic agent in the form of a holographic hand 402 in a cockpit of an aircraft 5 in accordance with at least one embodiment is shown. The vehicle operator is a pilot 404 of the aircraft 5. The automated action visualization system 200 received a pilot selection of a holographic agent in the form of a holographic hand. The automated action visualization system 200 received an automated control notification associated with an automated control action from an autopilot system 210. The automated control action is adjusting a control knob in the cockpit. The automated action visualization system 200 generated an agent action based on the automated control action. The agent action is a visual representation of an adjustment of the control knob. The automated action visualization system 200 transmitted a command to a hologram generation system 212 to generate the holographic agent to engage in the agent action of adjusting the control knob. The holographic agent is a holographic hand 402 that provides a visual representation of the adjustment of the control knob by the autopilot system 210 prior to the implementation of the adjustment of the control knob by the autopilot system 210.

Figure 5:
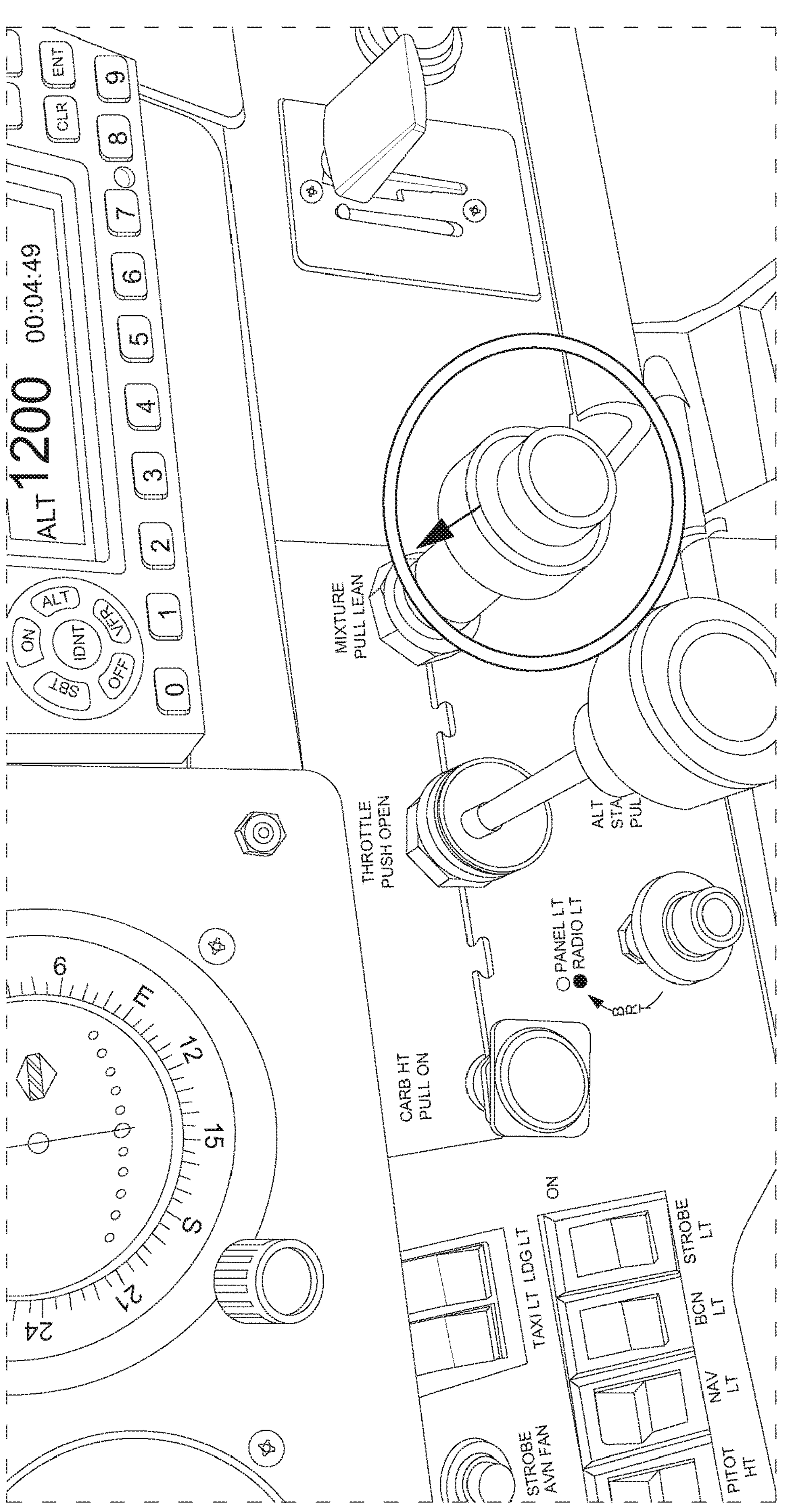
FIG. 5 is an exemplary illustration of a holographic agent in the form of a holographic symbol in a cockpit of an aircraft in accordance with at least one embodiment

Referring to FIG. 5, an exemplary illustration of a holographic agent in the form of a holographic symbol in a cockpit of an aircraft 5 in accordance with at least one embodiment is shown. The automated action visualization system 200 received a pilot selection of a holographic agent in the form of a holographic symbol. The automated action visualization system 200 received an automated control notification associated with an automated control action from an autopilot system 210. The automated control action is adjusting an air/fuel mixture. The automated action visualization system 200 generated an agent action based on the automated control action. The agent action is a visual representation of adjusting the air/fuel mixture. The automated action visualization system 200 transmitted a command to a hologram generation system 212 to generate the holographic agent to engage in the agent action of adjusting the air/fuel mixture. The holographic agent is a holographic symbol 502 that provides a visual representation of the adjustment of the air/fuel mixture by the autopilot system 210 prior to the implementation of the adjustment to the air/fuel mixture by the autopilot system 210. The holographic symbol 502 is a circle around the manual air/fuel mixture control and an arrow that indicates the direction of movement of the manual air/fuel mixture control.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for visualization of automated actions using a holographic agent comprising:
at least one processor; and
at least one memory communicatively coupled to the at least one processor, the at least one memory comprising instructions that upon execution by the at least one processor, cause the at least one processor to:
receive a selection of a holographic form of a holographic agent via a user interface;
receive a first automated control notification associated with a first automated control action at a first time, the first automated control action being scheduled for implementation at a second time by an autopilot system of a vehicle, the second time being after the first time;
generate a first agent action based at least in part on the first automated control action; and
transmit a first command to a hologram generation system to generate the holographic agent in the selected holographic form to engage in the first agent action at the first time, the first agent action being a visual representation of the implementation of the first automated control action by the autopilot system prior to the implementation of the first automated control action at the second time.

2. The system of claim 1, wherein the at least one memory comprises instructions that upon execution by the at least one processor, cause the at least one processor to:
receive a second automated control notification associated with a second automated control action at a third time, the second automated control action being scheduled for implementation at a fourth time by the autopilot system, wherein the second automated control action is responsive to a first manual control action implemented via a control interface following execution of the first automated control action and the fourth time is after the third time;
generate a second agent action based at least in part on the second automated control action; and
transmit a second command to the hologram generation system to generate the holographic agent in the selected holographic form to engage in the second agent action at the third time, the second agent action being a visual representation of the implementation of the second automated control action by the autopilot system prior to the implementation of the second automated control action at the fourth time.

3. The system of claim 1, wherein the at least one memory comprises instructions that upon execution by the at least one processor, cause the at least one processor to:
receive a third automated control notification associated with a third automated control action at a fifth time, the third automated control action being scheduled for implementation at a sixth time by the autopilot system, wherein the second automated control action is responsive to a second manual control action implemented via a control interface prior to execution of the first automated control action at the second time and the second manual control action operated to override the first automated control action;
generate a third agent action based at least in part on the third automated control action; and
transmit a third command to the hologram generation system to generate the holographic agent in the selected holographic form to engage in the third agent action at the fifth time, the third agent action being a visual representation of the implementation of the third automated control action by the autopilot system prior to the implementation of the third automated control action at the sixth time.

4. The system of claim 1, wherein the at least one memory comprises instructions that upon execution by the at least one processor, cause the at least one processor to:
receive a fourth automated control notification associated with a fourth automated control action at the first time, the fourth automated control action being scheduled for implementation at the second time by the autopilot system;
generate a fourth agent action based at least in part on the fourth automated control action; and
transmit a fourth command to a hologram generation system to generate another holographic agent in the selected holographic form to engage in the fourth agent action at the first time, the fourth agent action being a visual representation of the implementation of the fourth automated control action by the autopilot system prior to implementation of the fourth automated control action at the second time.

5. The system of claim 1, wherein the at least one memory comprises instructions that upon execution by the at least one processor, cause the at least one processor to:
receive at least one of a time, a geographic location, and a weather condition from a flight management system (FMS) of the vehicle; and
transmit the first command to the hologram generation system to generate the holographic agent based at least in part on the at least one of the time, the geographic location, and the weather condition.

6. The system of claim 1, wherein the at least one memory comprises instructions that upon execution by the at least one processor, cause the at least one processor to:
receive images of a vehicle operator from an operator monitoring system;

determine a workload of the vehicle operator and a state of the vehicle operator based on the images of the vehicle operator; and transmit the first command to the hologram generation system to generate the holographic agent at a vehicle location based on at least one of the workload and the state of the vehicle operator.

7. The system of claim 1, wherein the at least one memory comprises instructions that upon execution by the at least one processor, cause the at least one processor to:

receive images of a vehicle operator from an operator monitoring system;

determine a state of the vehicle operator based on the images of the vehicle operator; and activate operation of the system for visualization of automated actions using the holographic agent based on the state of the vehicle operator.

8. The system of claim 1, wherein the at least one memory comprises instructions that upon execution by the at least one processor, cause the at least one processor to transmit the first command to the hologram generation system to generate the holographic agent in a holographic form, the holographic form being one of an anthropomorphic form, a human head form, a human hand form, a textual form, a numerical form, a symbolic form, and an instructional image form.

9. The system of claim 1, wherein the vehicle is an aircraft.

10. A method for visualization of automated actions using a holographic agent comprising:

receiving a selection of a holographic form of a holographic agent via a user interface;

receiving a first automated control notification associated with a first automated control action at a first time, the first automated control action being scheduled for implementation at a second time by an autopilot system of a vehicle, the second time being after the first time;

generating a first agent action based at least in part on the first automated control action; and transmitting a first command to a hologram generation system to generate the holographic agent in the selected holographic form to engage in the first agent action at the first time, the first agent action being a visual representation of the implementation of the first automated control action by the autopilot system prior to implementation of the first automated control action at the second time.

11. The method of claim 10, further comprising:

receiving a second automated control notification associated with a second automated control action at a third time, the second automated control action being scheduled for implementation at a fourth time by the autopilot system, wherein the second automated control action is responsive to a first manual control action implemented via a control interface following execution of the first automated control action and the fourth time is after the third time;

generating a second agent action based at least in part on the second automated control action; and transmitting a second command to the hologram generation system to generate the holographic agent in the selected holographic form to engage in the second agent action at the third time, the second agent action being a visual representation of the implementation of the second automated control action by the autopilot system prior to implementation of the second automated control action at the fourth time.

12. The method of claim 10 further comprising:

receiving a third automated control notification associated with a third automated control action at a fifth time, the third automated control action being scheduled for implementation at a sixth time by the autopilot system, wherein the second automated control action is responsive to a second manual control action implemented via a control interface prior to execution of the first automated control action at the second time and the second manual control action operated to override the first automated control action;

generating a third agent action based at least in part on the third automated control action; and transmitting a third command to the hologram generation system to generate the holographic agent in the selected holographic form to engage in the third agent action at the fifth time, the third agent action being a visual representation of the implementation of the third automated control action by the autopilot system at the sixth time.

13. The method of claim 10 further comprising:

receiving a fourth automated control notification associated with a fourth automated control action at the first time, the fourth automated control action being scheduled for implementation at the second time by the autopilot system;

generating a fourth agent action based at least in part on the fourth automated control action; and transmitting a fourth command to a hologram generation system to generate another holographic agent in the selected holographic form to engage in the fourth agent action at the first time, the fourth agent action being a visual representation of the implementation of the fourth automated control action by the autopilot system prior to implementation of the fourth automated control action at the second time.

14. The method of claim 10 further comprising:

receiving at least one of a time, a geographic location, and a weather condition from a flight management system (FMS) of the vehicle; and transmitting the first command to the hologram generation system to generate the holographic agent based at least in part on the at least one of the time, the geographic location, and the weather condition.

15. The method of claim 10 further comprising:

receiving images of a vehicle operator from an operator monitoring system;

determining a workload of the vehicle operator and a state of the vehicle operator based on the images of the vehicle operator; and transmitting the first command to the hologram generation system to generate the holographic agent at a vehicle location based on at least one of the workload and the state of the vehicle operator.

16. The method of claim 10 further comprising:

receiving images of a vehicle operator from an operator monitoring system;

determining a state of the vehicle operator based on the images of the vehicle operator; and activating operation of the system for visualization of automated actions using the holographic agent based on the state of the vehicle operator.

17. The method of claim 10 further comprising transmitting the first command to the hologram generation system to generate the holographic agent in a holographic form, the holographic form being one of an anthropomorphic form, a human head form, a human hand form, a textual form, a numerical form, a symbolic form, and an instructional image form.

18. The method of claim 10, wherein the vehicle is an aircraft.

19. An aircraft including a system for visualization of automated actions using a holographic agent comprising:

at least one processor; and at least one memory communicatively coupled to the at least one processor, the at least one memory comprising instructions that upon execution by the at least one processor, cause the at least one processor to:

receive a selection of a holographic form of a holographic agent via a user interface;

receive a first automated control notification associated with a first automated control action at a first time, the first automated control action being scheduled for implementation at a second time by an autopilot system of a vehicle, the second time being after the first time;

generate a first agent action based at least in part on the first automated control action; and transmit a first command to a hologram generation system to generate the holographic agent in the selected holographic form to engage in the first agent action at the first time, the first agent action being a visual representation of the implementation of the first automated control action by the autopilot system prior to implementation of the first automated control action at the second time.

20. The aircraft of claim 19, wherein the at least one memory comprises instructions that upon execution by the at least one processor, cause the at least one processor to:

receive a second automated control notification associated with a second automated control action at a third time, the second automated control action being scheduled for implementation at a fourth time by the autopilot system, wherein the second automated control action is responsive to a first manual control action implemented via a control interface following execution of the first automated control action and the fourth time is after the third time;

generate a second agent action based at least in part on the second automated control action; and transmit a second command to the hologram generation system to generate the holographic agent in the selected holographic form to engage in the second agent action at the third time, the second agent action being a visual representation of the implementation of the second automated control action by the autopilot system prior to implementation of the second automated control action at the fourth time.

* * * * *